(No Model.) 2 Sheets—Sheet 1.

J. A. MACKINNON.
SPLIT PULLEY.

No. 397,654. Patented Feb. 12, 1889.

Witnesses:
Chas. J. Buchheit
Theo. L. Popp

J. A. Mackinnon, Inventor.
By Wilhelm & Bonner
Attorneys.

(No Model.) 2 Sheets—Sheet 2.

J. A. MACKINNON.
SPLIT PULLEY.

No. 397,654. Patented Feb. 12, 1889.

Witnesses:
Chas. J. Buchheit.
Theo. L. Popp.

J. A. Mackinnon Inventor;
By Wilhelm Bonner
Attorneys.

UNITED STATES PATENT OFFICE.

JOHN A. MACKINNON, OF BROOKLYN, NEW YORK.

SPLIT PULLEY.

SPECIFICATION forming part of Letters Patent No. 397,654, dated February 12, 1889.

Application filed March 20, 1888. Serial No. 267,820. (No model.)

*To all whom it may concern:*

Be it known that I, JOHN A. MACKINNON, of the city of Brooklyn, in the county of Kings and State of New York, have invented new and useful Improvements in Split Pulleys, of which the following is a specification.

This invention relates to split pulleys which are divided or split transversely through the center, so that the pulley can be secured to a shaft at any desired point without the necessity of removing the shaft from its bearings or shifting or removing other pulleys already secured to the shaft; and one part of my invention relates particularly to such pulleys in which the rim is composed of several wooden rings.

The object of my invention is to provide simple and efficient fastenings for securing together the several rings composing the rim and a simple fastening for uniting the meeting ends of the sections of the rim; also, to construct the hub of the pulley in such a manner that it can be readily and firmly clamped upon the shaft, and, finally, to improve the construction of the arms connecting the hub and rim.

The invention consists of the improvements, which will be hereinafter fully set forth, and pointed out in the claims.

Figure 1:
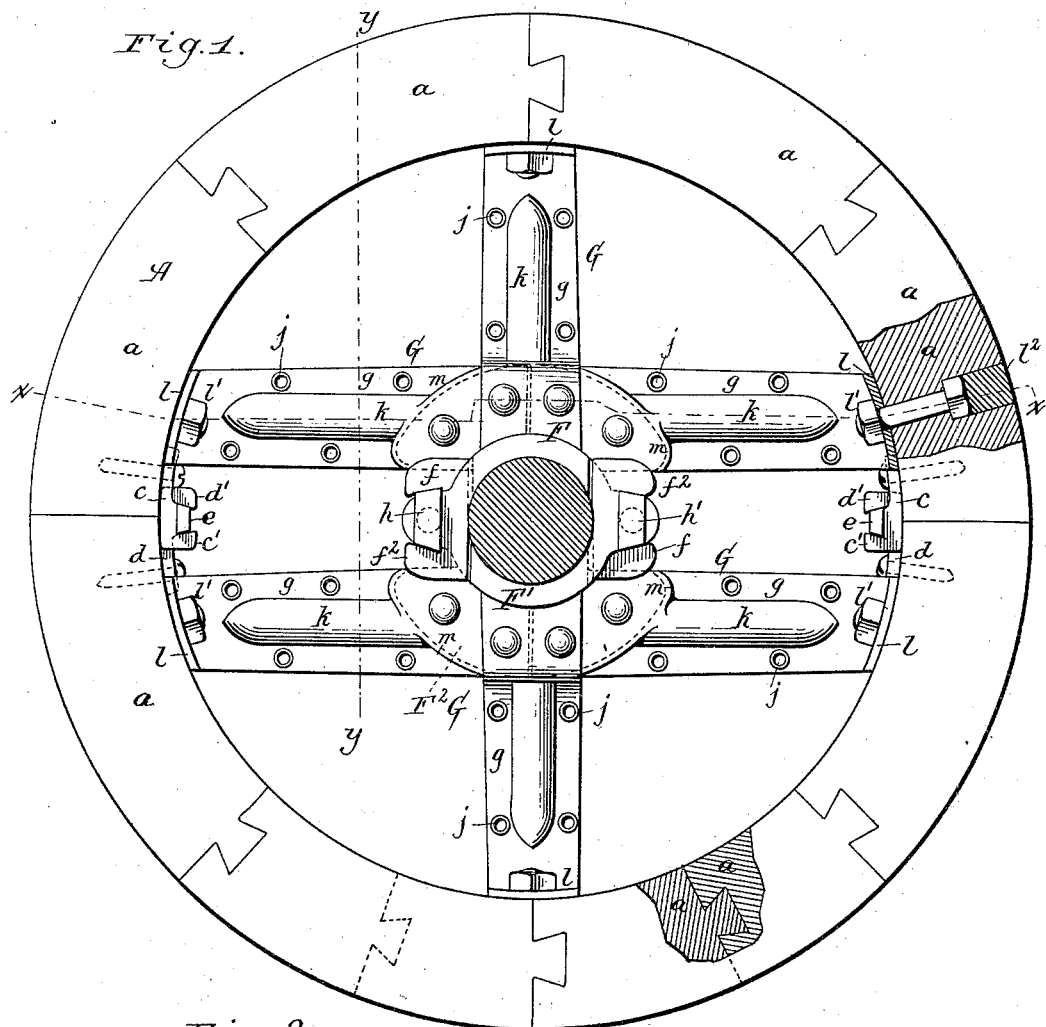
Figure 2:
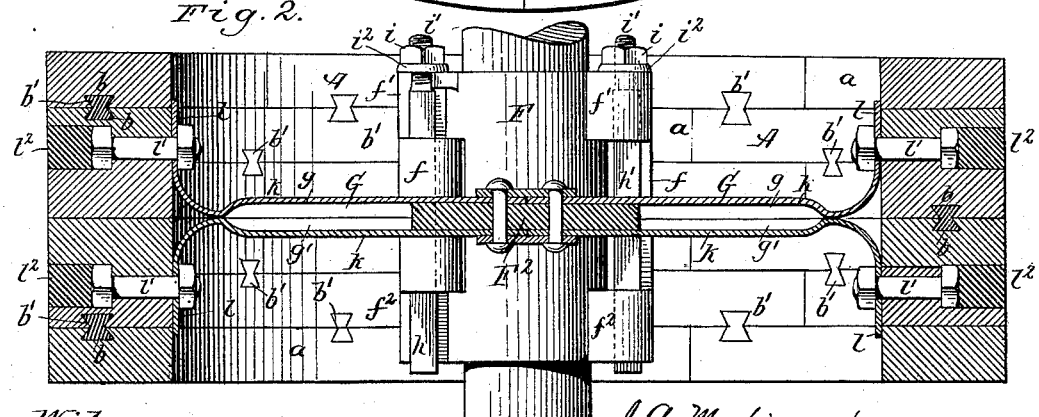
Figure 3:
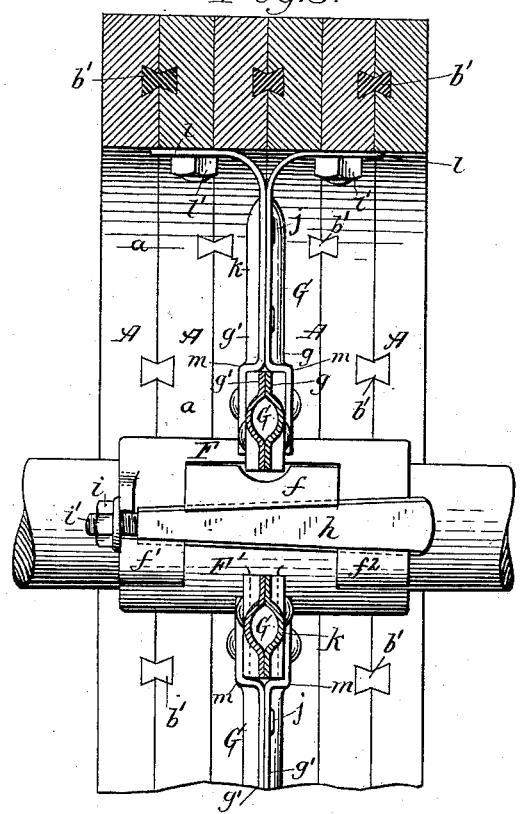
Figure 4:
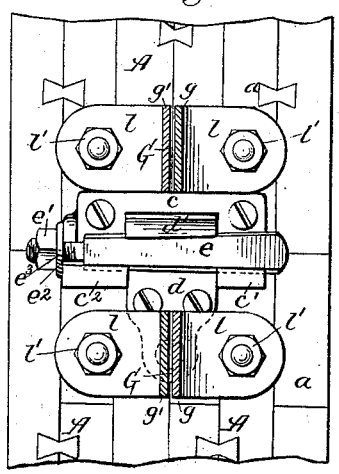
Figure 6:
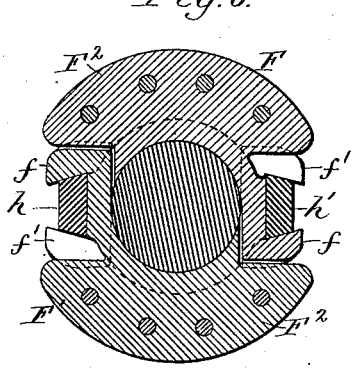
Figure 5:
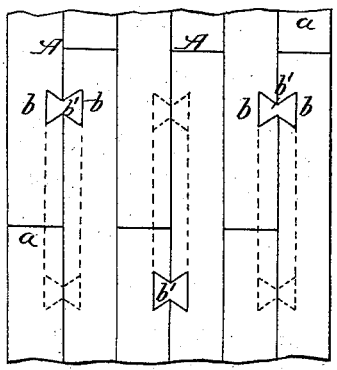
Figure 7:
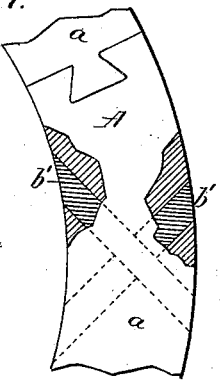
Figure 8:
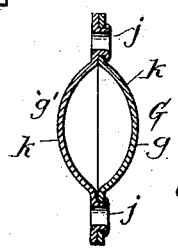

In the accompanying drawings, consisting of two sheets, Figure 1 is a side elevation of my improved pulley, partly in section. Fig. 2 is a cross-section thereof in line $xx$, Fig. 1. Fig. 3 is a cross-section in line $yy$, Fig. 1. Fig. 4 is an inside elevation of the fastening whereby the meeting ends of the rim-section are secured together. Fig. 5 is a fragmentary elevation of the face of the rim. Fig. 6 is a central vertical section through the hub. Fig. 7 is a fragmentary sectional elevation of two adjacent wooden rings of the rim of the pulley. Fig. 8 is a cross-section of the arms.

Like letters of reference refer to like parts in the several figures.

The rim of the pulley consists of a number of wooden rings, A, arranged side by side, each of which is preferably composed of a series of segments, $a$, which are secured together by dovetails, as shown in Fig. 1. Every two rings A are provided in their contiguous sides with two dovetail grooves, $b$, extending through the rim of the pulley from the outer to the inner side, and forming together a double dovetail opening through the rim.

$b'$ are double dovetailed keys inserted in the grooves $b$, whereby every two adjoining rings A are firmly secured together. The grooves $b$ are arranged obliquely or at an angle to the radius of the pulley, and each locking-bar connecting one pair of rings A is arranged in a plane which intersects the plane of the locking-bars on either side, as shown in Figs. 5 and 7. By this arrangement the locking-bars serve to brace the rings of the rim in all directions, and form a rigid connection between the rings, which prevents the same from being moved out of place by the strains to which the pulley is subjected.

When the rim of the pulley is completed, it is divided into two equal sections or halves by sawing the rim transversely through its center. The fastenings connecting the meeting ends of the two rim-sections are each constructed as follows:

$c$, Figs. 1 and 4, represents a plate secured to the inner side of one of the rim-sections, at or near the end thereof, and provided with two hooks or lugs, $c'\ c^2$, projecting beyond the end of the section.

$d$ is a plate secured to the inner side of the opposite section of the rim, at or near the end thereof, and provided with a hook or lug, $d'$, which engages between the hooks $c'\ c^2$ of the plate $c$.

$e$ is a wedge or key arranged between the hooks $c'$, $c^2$, and $d'$ of the plates $c$ and $d$, whereby these plates are interlocked with each other, and the meeting ends of the rim-sections are firmly secured together. The inner or contact faces of the hooks $c'\ c^2\ d'$, which bear against the sides of the wedge $e$, are beveled, as shown, and the edges of the wedge are correspondingly beveled. By this construction a dovetailed connection is formed between the hooks $c'\ c^2\ d'$ and the wedge, which produces a tight connection between the parts and prevents the wedge from being loosened in its seat by centrifugal force or otherwise. The interlocking lugs operate as a dowel in preventing lateral displacement of the contiguous ends of the rim-sections. The wedge $e$ is held in its seat against accidental displacement by a clamping-nut, $e'$, applied to a screw shank or stem, $e^2$, formed at one end of the wedge, a washer, $e^3$, being interposed between this clamping-nut and the adjacent end of the plate $c$. The dovetail lugs and key hold the ends of the rim-sections against radial movement in either direction. The meeting ends of the rim-sections are firmly drawn together upon forcing the wedge $e$ into its seat, as the wedge has three bearing-surfaces upon the hooks or lugs $c'$ $c^2$ $d'$.

The hub of the pulley is composed of two semi-cylindrical parts or halves, F F', which embrace opposite sides of the shaft and are connected with the rim of the pulley by arms G. Each part F F' is provided on one side, at or near its center, with a projecting hook or lug, $f$, and on its opposite side with two similar hooks or lugs, $f'$ $f^2$, arranged at or near the ends of the parts, so as to form a space between these hooks which receives the central hook, $f$, of the other part, as shown in Figs. 1, 2, 3, and 6. Upon placing the parts F F' of the hub against opposite sides of the shaft the central hook, $f$, of each part enters the space between the end hooks $f'$ $f^2$, of the opposing part, so that the hooks of the two parts, when thus interlocked with each other, are located, respectively, on opposite sides of the center line of the hub. These interlocking hooks or lugs also prevent sidewise displacement of the contiguous portions of the hub-sections.

$h$ $h'$ represent the wedges or keys arranged between the interlocked hooks $f$ $f'$ $f^2$, whereby the two parts of the hub are tightly clamped against the shaft. The hooks or lugs $f$ $f'$ $f^2$ are beveled similar to the hooks $c'$ $c^2$ $d'$ of the fastenings uniting the meeting ends of the rim-sections, and the wedges $h$ $h'$ are likewise beveled, so as to be held firmly in place between the hooks and resist the tendency of the centrifugal force to loosen the fastening.

$i$ represents clamping-nuts applied to the threaded ends $i'$ of the wedges $h$ $h'$, and $i^2$ are washers arranged between the nuts $i$ and the adjacent ends of the hub-sections F F'. These nuts and washers hold the wedges firmly in their seats after being driven home. Upon driving the wedges into the dovetailed seats of the hooks $f$ $f'$ $f^2$ the two parts of the hub are drawn toward each other and caused to embrace the shaft tightly. Sufficient space is left between the parts of the hub to permit the same to be drawn together without coming in contact with each other. As each wedge has three bearing-surfaces—one at the center and one at each end—all parts of the two halves of the hub are evenly and uniformly clamped upon the shaft. The bore of the hub is made somewhat larger than the average size of the shafts upon which the pulley is to be used, and split bushings having bores of various sizes and made of fibrous or other suitable material are used in connection with the hub, so that a pulley having a hub of given size can be applied to shafts of different diameters by using a bushing which properly fits the shaft, the pulley being held on the shaft by compression of the bushing nearly across the width of the face of the pulley.

My improved hub is simple in construction, as the parts thereof are interchangeable and can be manufactured at comparatively small cost. The parts F F' of the hub are each provided with a segmental flange, $F^2$, to which the inner ends of the arms G are secured. These arms are each composed of two plates, $g$ $g'$, which are stamped out of sheet metal, and are secured together by eyelets $j$, which are stamped or otherwise formed on one of the plates $g$ $g'$, and pass through openings formed in the other plate. After being passed through these openings the eyelets are upset in any suitable manner. This forms a simple and inexpensive fastening for securing the two plates of each arm together. The plates $g$ $g'$ are each provided with a convex longitudinal rib, $k$, which is formed by indenting the plates. Upon securing the plates together a hollow arm having an elliptical cross-section is produced, as shown in Fig. 8. The upper ends of the plates $g$ $g'$ are turned outwardly to form flanges $l$, which are secured to the inner side of the rim of the pulley by bolts $l'$. These bolts are arranged in radial openings formed in the rim, and the heads of the bolts are countersunk, as shown in Figs. 1 and 2, the vacant portions of said openings being closed by filling-blocks $l^2$, as shown. The inner flattened ends of the plates $g$ $g'$ of the arms G are secured to opposite sides of the flanges $F^2$ by rivets or other suitable means. The inner ends of these plates are bent to form offsets or shoulders $m$, which enable the innermost portions of the arms to rest against the outer sides of the flanges $F^2$.

I claim as my invention—

1. In a pulley, the combination, with the rim composed of rings provided in their contiguous sides with oblique dovetail grooves, of dovetail keys or locking-bars arranged in said grooves, the planes of the keys connecting one pair of rings intersecting the plane of the keys connecting the adjacent pair of rings, substantially as set forth.

2. In a split pulley, the combination, with two pulley-sections, of a plate secured to one of said sections and provided with two hooks or lugs separated by an open space, a plate secured to the opposing section and provided with a hook or lug projecting into the space between the hooks or lugs of the first-mentioned plate, and a key or wedge engaging between the inner faces of said interlocking hooks or lugs, substantially as set forth.

3. In a split pulley, the combination, with two pulley-sections, of a plate secured to one of said sections and provided with two hooks or lugs having beveled inner faces and separated by an open space, a plate secured to the opposing section and provided with a hook or lug projecting into the space between the hooks or lugs of the first-mentioned plate and having a beveled inner face, and a key or wedge having beveled sides engaging between the inner beveled faces of said interlocking hooks or lugs, substantially as set forth.

4. In a split pulley, the combination, with the meeting ends of the rim, of a plate, $c$, secured to one of said meeting ends and provided with two hooks or lugs, $c'$ $c^2$, a plate, $d$, secured to the opposing end of the rim and provided with a hook or lug, $d'$, and a key or wedge, $e$, engaging between the hooks $c'$ $c^2$ $d'$ and provided with a screw-shank, $e^2$, and clamping-nut $e'$, substantially as set forth.

5. In a split pulley, a divided hub composed of two semicircular sections or halves, F F', each provided on one side with two lugs or hooks, $f'$ $f^2$, and on the opposite side with a single hook, $f$, the hook $f$ of one section engaging in the space between the hooks $f'$ $f^2$ of the other section, and keys or wedges $h$ $h'$, engaging between the hooks $f$ $f'$ $f^2$, substantially as set forth.

6. In a pulley, the arms G, each composed of two plates, $g$ $g'$, one plate being provided with eyelets $j$, formed integral therewith and passing through openings in the other plate, against which the eyelets are headed, substantially as set forth.

7. The combination, with the rim and the divided hub composed of two parts, each provided with an external flange, $F^2$, of the arms G, each composed of two bent plates, $g$ $g'$, secured with their outer ends to the rim and with their inner ends to the flanges $F^2$ of the hub-sections, substantially as set forth.

8. The combination, with the rim and the divided hub composed of two parts, each provided with an external flange, $F^2$, of the arms G, each composed of two bent plates, $g$ $g'$, provided at their outer ends with lips or flanges $l$, whereby they are secured to the rim, and having their inner ends provided with shoulders $m$ and resting against the flanges $F^2$, substantially as set forth.

Witness my hand this 15th day of March, 1888.

JOHN A. MACKINNON.

Witnesses:
JOHN A. MACKINNON, Jr.,
DAHLIA E. HARD.